United States Patent
Nohra et al.

(10) Patent No.: US 9,794,652 B2
(45) Date of Patent: Oct. 17, 2017

(54) SMART MONITORING SYSTEM AND METHOD OF OPERATION

(71) Applicant: Delta Systems, Inc., Streetsboro, OH (US)

(72) Inventors: Tanios Elias Nohra, Broadview Heights, OH (US); Spencer C. Allemang, South Euclid, OH (US)

(73) Assignee: Delta Systems, Inc., Streetsboro, OH (US)

( * ) Notice: Subject to any disclaimer, the term of this patent is extended or adjusted under 35 U.S.C. 154(b) by 26 days.

(21) Appl. No.: 14/528,154

(22) Filed: Oct. 30, 2014

(65) Prior Publication Data

US 2015/0116132 A1   Apr. 30, 2015

Related U.S. Application Data

(60) Provisional application No. 61/898,129, filed on Oct. 31, 2013.

(51) Int. Cl.
*H04Q 9/00* (2006.01)

(52) U.S. Cl.
CPC .......... *H04Q 9/00* (2013.01); *H04Q 2209/43* (2013.01)

(58) Field of Classification Search
CPC .............................. H04Q 9/00; H04Q 2209/43
USPC ... 340/870.07, 10.1–10.6, 572.1–572.9, 901, 340/988, 995, 425.5, 531, 54, 691, 393, 340/825.06, 825.3, 385; 251/129.04; 370/338
See application file for complete search history.

(56) References Cited

U.S. PATENT DOCUMENTS

| | | | | |
|---|---|---|---|---|
| 5,540,037 A * | 7/1996 | Lamb | ..................... | A01D 34/44 180/65.1 |
| 5,657,224 A * | 8/1997 | Lonn | ..................... | A01D 34/475 701/31.4 |
| 6,230,089 B1 * | 5/2001 | Lonn | ..................... | A01D 34/475 701/34.3 |
| 6,377,168 B1 | 4/2002 | Harvey | | |
| 6,609,357 B1 | 8/2003 | Davis et al. | | |
| 7,034,674 B2 | 4/2006 | Harvey | | |
| 7,154,814 B2 | 12/2006 | Straka | | |
| 2005/0053447 A1 * | 3/2005 | Bucher | ................. | E01C 19/004 411/470 |
| 2007/0144133 A1 * | 6/2007 | Drake | .................... | A01D 34/82 56/323 |
| 2008/0084334 A1 * | 4/2008 | Ballew | ................... | G06Q 10/06 340/990 |
| 2010/0066503 A1 * | 3/2010 | Rhie | ........................ | G01S 1/68 340/10.1 |

(Continued)

*Primary Examiner* — George Bugg
*Assistant Examiner* — Thang Tran
(74) *Attorney, Agent, or Firm* — Tarolli, Sundheim, Covell & Tummino LLP; John A. Yirga, Esq.

(57) ABSTRACT

Systems and methods are described that can provide a fleet management solution for a fleet of power equipment and other power equipment machines. The fleet management solution can include receiving a wireless signal corresponding to a power equipment machine according to a wireless protocol. The fleet management solution can also include determining a status information corresponding to the power equipment machine based on the wireless signal. The fleet management solution can also include performing an action related to the power equipment machine based on the corresponding status information.

14 Claims, 20 Drawing Sheets

(56) References Cited

U.S. PATENT DOCUMENTS

| | | | | |
|---|---|---|---|---|
| 2010/0114464 | A1* | 5/2010 | Miller | B60K 28/04 |
| | | | | 701/113 |
| 2010/0145865 | A1* | 6/2010 | Berger | G06Q 10/08 |
| | | | | 705/307 |
| 2011/0295460 | A1* | 12/2011 | Hunt | G06Q 10/00 |
| | | | | 701/519 |
| 2011/0301807 | A1* | 12/2011 | Staaf | G06Q 10/06 |
| | | | | 701/29.3 |
| 2013/0006715 | A1* | 1/2013 | Warkentin | G06Q 10/0639 |
| | | | | 705/7.38 |
| 2013/0096799 | A1* | 4/2013 | Horne | G06F 17/00 |
| | | | | 701/99 |
| 2013/0234853 | A1* | 9/2013 | Kazerouni | G08B 13/1427 |
| | | | | 340/572.1 |
| 2014/0229033 | A1* | 8/2014 | Cook | G05B 19/00 |
| | | | | 701/2 |
| 2015/0007541 | A1* | 1/2015 | Albinger | A01D 69/02 |
| | | | | 56/10.2 A |
| 2015/0109142 | A1* | 4/2015 | Mejegard | G06Q 10/06 |
| | | | | 340/870.07 |

* cited by examiner

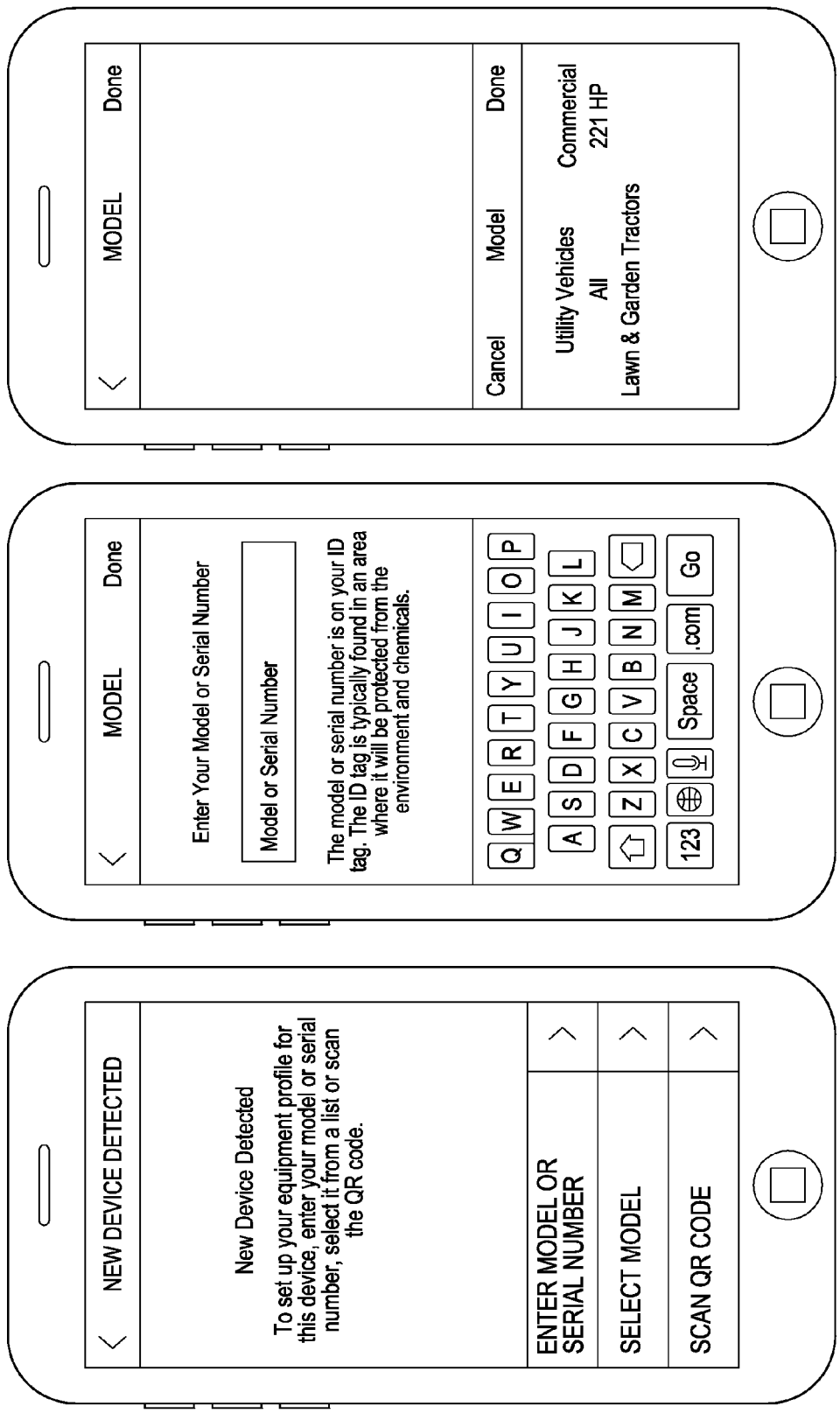

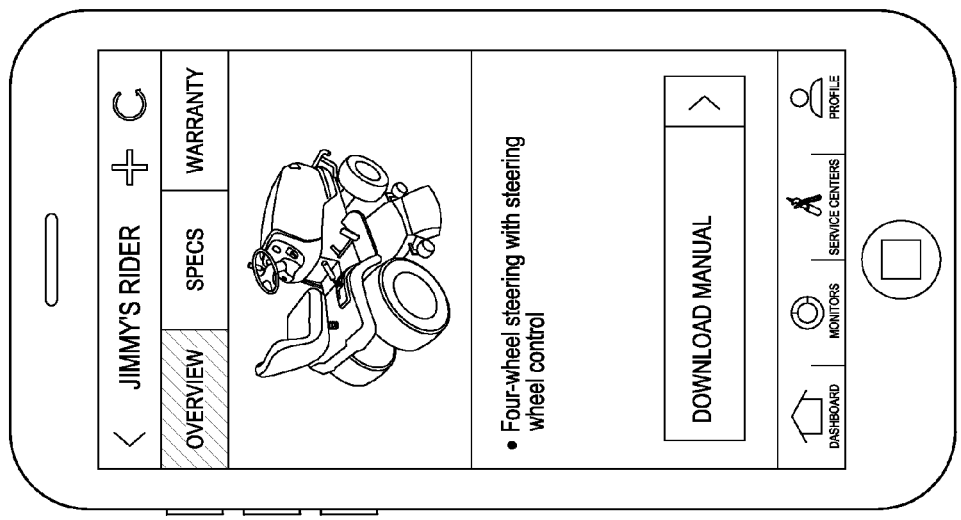

SMART MONITORING SYSTEM AND METHOD OF OPERATION

CROSS REFERENCES TO RELATED APPLICATIONS

The following application claims priority under 35 U.S.C. §119(e) to U.S. Provisional Patent Application Ser. No. 61/898,129 filed Oct. 31, 2013 entitled SMART MONITORING SYSTEM AND METHOD OF OPERATION. The above-identified application is incorporated herein by reference in its entirety for all purposes.

TECHNICAL FIELD

The present disclosure generally relates to fleet management, and, in particular, to systems and methods that can monitor the operation of a fleet of power equipment machines.

BACKGROUND

Engine operating time hour meters are frequently used in power equipment. Power equipment includes, but is not limited to, riding lawn mowers, lawn and agricultural tractors, snowmobiles, snowblowers, jet skis, boats, all terrain vehicles, bulldozers, generators, and the like. Hour meters among other things, let the owner and/or manufacturer of the power equipment monitor how long the engine has been operated, when the equipment is due for repair/maintenance service, and whether the equipment is still under warranty. The hour meter and/or controller typically communicate to a digital or an analog gauge affixed to a dash or operator's panel of the power equipment.

Further discussion relating to conventional hour meters and their different constructions can be found in U.S. Pat. Nos. 6,377,168; 6,609,357; 7,034,674; and 7,154,814 that were assigned to the assignee of the present disclosure. The above U.S. Patents are incorporated herein in their entireties by reference.

SUMMARY

The present disclosure generally relates to fleet management. The fleet can include a plurality of power equipment and other machines. In particular, the present disclosure relates to systems and methods that can monitor the operation of one or more power equipment machines in a fleet of power equipment machines.

One example embodiment of the present disclosure can include a smart monitoring system that can be utilized to monitor the operation of a fleet of power equipment machines. The system can include a non-transitory computer readable storage medium storing machine executable instructions and a processor to access the non-transitory computer readable storage medium and execute the machine executable instructions to implement the functionality of the system. The system can include a transceiver that can receive a wireless signal from a power equipment machine according to a wireless protocol. The system can also include a control module that can determine status information for the power equipment machine based on the wireless signal. The system can also include a display module that can render a visualization based on the status information to display on a display device.

Another example embodiment of the present disclosure can include a smart monitoring method that can be utilized to monitor the operation of a fleet of power equipment machines. The operations of the method can be performed by a system that includes a non-transitory memory and a processor. The operations can include receiving a wireless signal corresponding to a power equipment machine according to a wireless protocol. The operations can also include determining status information for the power equipment machine. The operations can also include performing, by the system, an action related to the power equipment machine based on the corresponding status information.

A further example embodiment of the present disclosure can include a mobile device that can be utilized to monitor the operation of a fleet of power equipment machines. The mobile device can include a non-transitory computer readable storage medium storing machine executable instructions and a processor to access the non-transitory computer readable storage medium and execute the machine executable instructions that can implement the fleet management functionality. The machine executable instructions can include a transceiver that can receive a plurality of wireless signal from a plurality of power equipment machines in a fleet according to a wireless protocol. The machine executable instructions can also include a control module to determine status information for the plurality of power equipment machines based on the plurality of wireless signals. The machine executable instructions can also include a global location unit to associate location data with the status information for each of the plurality of power equipment machines. The machine executable instructions can also include a messaging unit to transmit messages related to the status information and the location for each of the plurality of power equipment machines to a primary device at a remote location.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals refer to like parts unless described otherwise throughout the drawings and in which:

FIG. 8 is a graphical user interface of the smart monitoring system as shown on a remote device in accordance with one example embodiment of the present disclosure;

FIG. 9 is a graphical user interface of the smart monitoring system as shown on a remote device in accordance with one example embodiment of the present disclosure;

FIG. 10 is a graphical user interface of the smart monitoring system as shown on a remote device in accordance with one example embodiment of the present disclosure;

FIG. 13 is a graphical user interface of the smart monitoring system as shown on a remote device in accordance with one example embodiment of the present disclosure;

FIG. 14 is a graphical user interface of the smart monitoring system as shown on a remote device in accordance with one example embodiment of the present disclosure;

FIG. 19 is a graphical user interface of the smart monitoring system as shown on a remote device in accordance with one example embodiment of the present disclosure;

Figure 1:
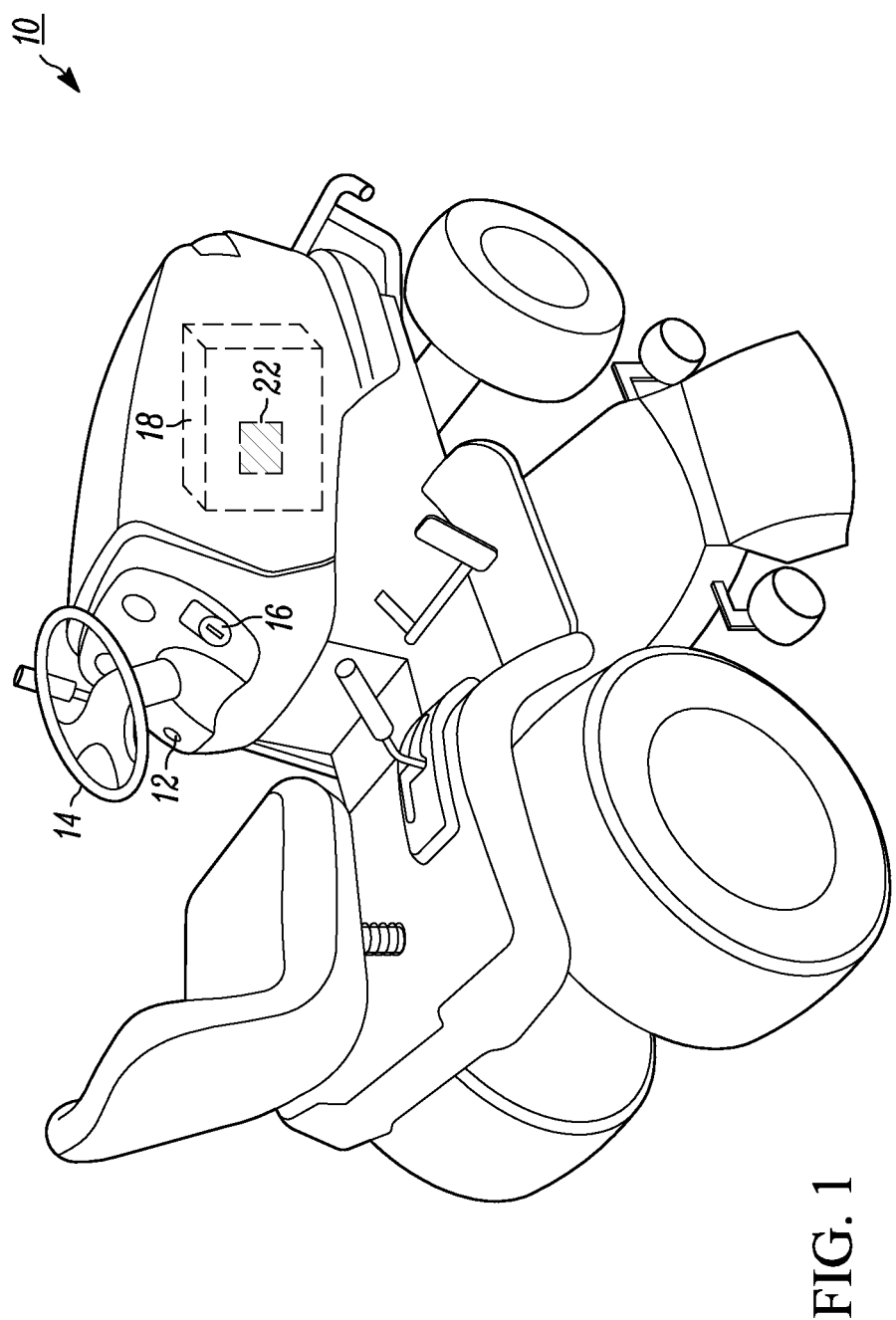
FIG. 1 is perspective view of power equipment, such as a lawn tractor in accordance with one example embodiment of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures generally wherein like numbered features shown therein refer to like elements throughout unless otherwise noted. The present disclosure generally relates to a smart monitoring system and smart monitoring method that can be used to facilitate fleet management. In some examples, the fleet can include a plurality of power equipment machines. For example, the power equipment machines can transmit information via a remote wireless protocol to a remote computing device, such as a mobile phone, a computer and/or personal digital assistant, which can perform operations that can facilitate the fleet management.

With reference now to the figures and in particular to FIG. 1, illustrated is an example of a power equipment machine 10. As illustrated, the power equipment machine 10 is a lawn tractor. The power equipment machine 10 can employs a smart monitoring system in accordance with one example embodiment of the present disclosure. While a lawn tractor is shown as the power equipment machine 10 of FIG. 1, the power equipment machine can be any machine with an engine without departing from the spirit and scope of the present invention. For example, the power equipment machine 10 can be a motorized land or marine vehicle, a snow blower, a snow mobile, a push mower, a tractor, an all-terrain-vehicle, and/or a generator.

As illustrated in FIG. 1, the power equipment machine 10 includes an instrument panel 12 positioned behind a steering wheel 14 for operating the directional control of the lawn tractor. The instrument panel 12 includes an ignition switch 16 for starting an engine 18 the lawn tractor and one or more indicator display modules. For example, the indicator display modules can include an hour meter, a fuel meter, or the like. A central control module 22 or slave (S) can be coupled to the engine 18 and can include one or more sensors or monitors to record information related to a status of the power equipment machine and a transceiver to exchange (e.g., send and/or receive) information with a remote device. In some embodiments, the transceiver can include a Bluetooth Low Energy radio. However, the transceiver can employ one or more other wireless protocols. The central control module 22 receives its power from a power supply that is used by the power equipment machine 10, such as a battery. The central control module 22 can also include a microcontroller or a processor and includes firmware/software and/or circuitry for analyzing or receiving input data for an hour-meter, voltage monitor, oil pressure sensor, engine temperature sensor, and fuel level sensor. In another example embodiment, the central control module 22 includes a radio transmitter coupled to or in communication with the microcontroller or an application specific analog circuit (ASIC) or a combination thereof. One suitable radio transmitter is sold under part number CC2540, which is commercially available by Texas Instruments, the specification data sheet being incorporated herein by reference.

The control module 22 of the power equipment machine 10 can store, transmit, and receive inner-active information related to the operations of the power equipment device. For example, the inner-active information can include, but is not limited to, information related to hours of engine operation, oil pressure, fuel level, engine temperature, sensor status, mechanical wear, service reminders, operation trouble shooting guidance, link to service or part suppliers, signature identification unique to each tractor, remote operation/control, remote status check (ON or OFF), time stamping, remote start-up, remote brake, and/or remote power-take-off (PTO) enablement and disablement. Even though the central control module 22 in the illustrated example embodiment is located on or near the engine 18, the central control module could be positioned at other locations on the power equipment machine 10 without departing from the spirit and scope of the present disclosure. In some embodiments, components of the central control module 22 can be distributed around the power equipment machine 10.

Figure 2:
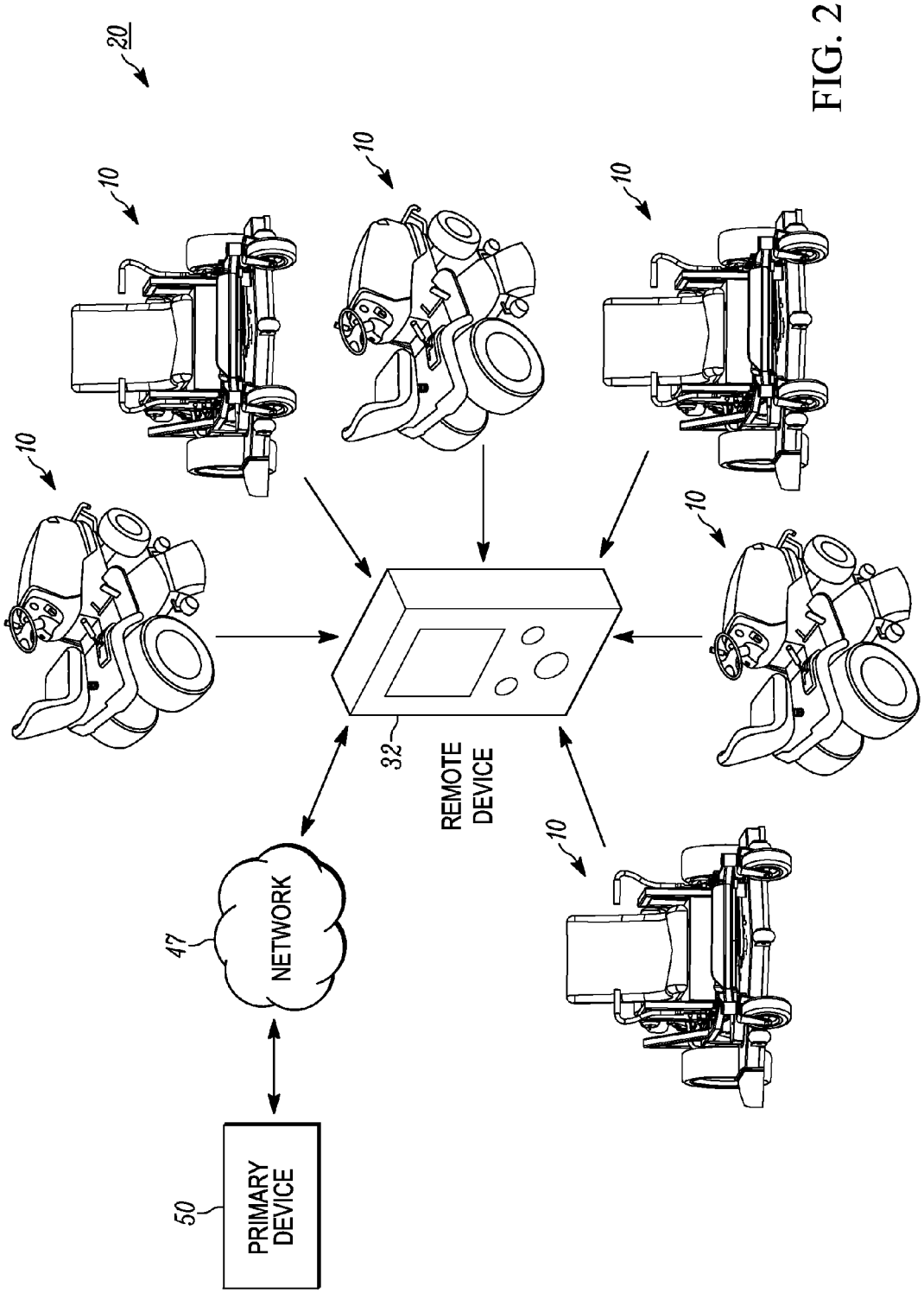
FIG. 2 is a smart monitoring system that can be utilized to monitor the operation of a fleet of power equipment machines in accordance with one embodiment of the present disclosure.

FIG. 2 illustrates a smart monitoring system 20 that can be utilized to monitor the operation of a fleet of power equipment machines 10 in accordance with one embodiment of the present disclosure. The smart monitoring system can include one or more power equipment machines 10 (e.g., each associated with a central control module or slave (S)) and a remote device 32 (e.g., associated with a remote control module or master (M). The remote device 32 can also communicate with a primary device 50 (a computer and/or database located at a remote location). For example, the remote device 32 can be associated with a fleet leader located with the fleet of power equipment machines 10, and the primary device 50 can be associated with a fleet manager located at the head office. In other examples, the primary device 50 can be associated with a third party, such as a part supplier, a power equipment dealer, a service store, and the like.

Figure 4:
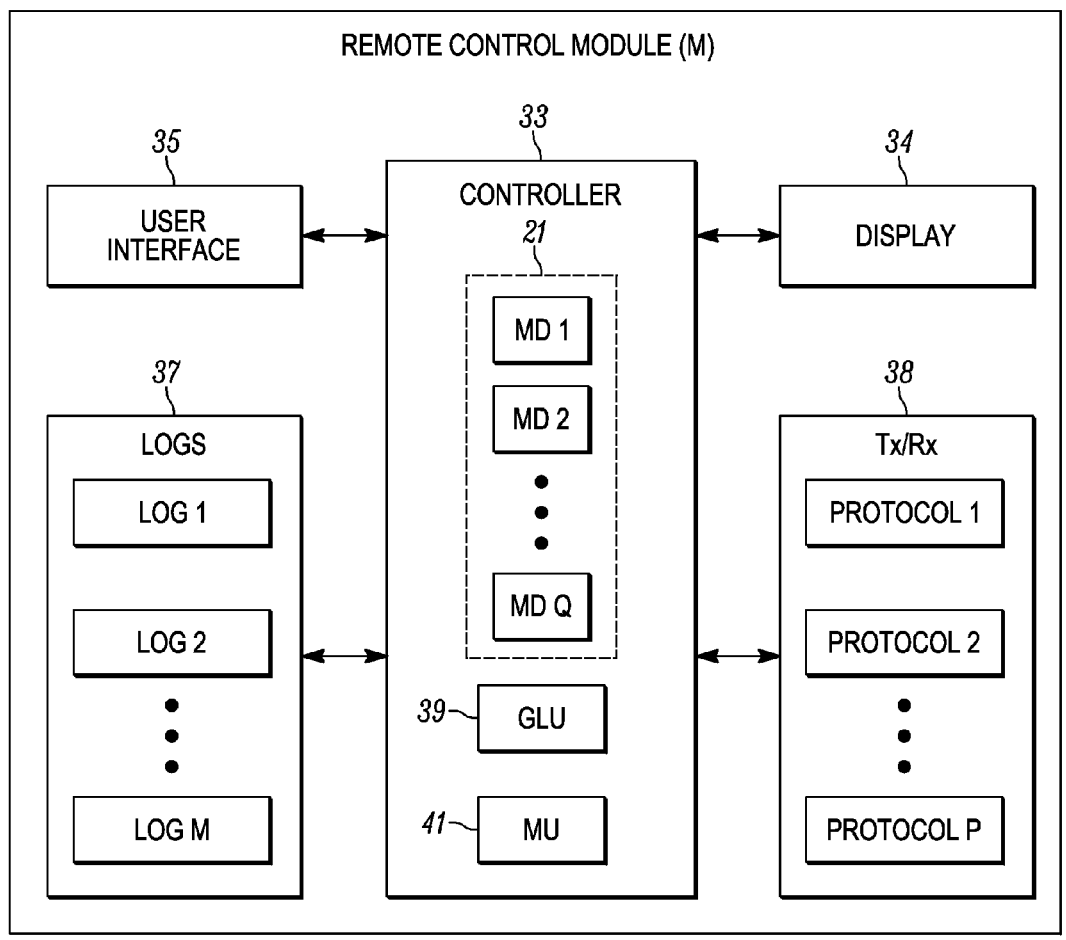
FIG. 4 is a remote control module that can be utilized by a remote device within a smart monitoring system in accordance with one embodiment of the present disclosure.

For example, the remote device 32 can include a transceiver that can communicate according to one or more wireless protocols (e.g., one wireless protocol to communicate with the power equipment machines 10 and another wireless protocol to communicate with the primary device 50). For example, the wireless protocol to communicate with the power equipment machines 10 can be a protocol that transmits data across short distances, such as Bluetooth low energy ("BLE") protocol, which allows for minimal power consumption for both the central control module 22 and remote device 32 in the range of 18 mA. As well, the BLE protocol allows the user to receive and transmit inner-active information 21 at a range of 150 feet between the control module 22 and remote device 32. It should be appreciated that other wireless protocols 38 as illustrated in FIG. 4 could be used such as ANT+, without departing from the spirit and scope of the present disclosure. The transceivers can modulate the inner-active information onto a radio frequency and transmit it through a respective antenna operatively connected to a transceiver of the remote device 32 and central control module of the power equipment machine 10, as well as demodulate and digitize the radio frequency signals received by the antennas to provide data in a useful form for digital processing by both the remote device 32 and central control module 22.

As another example, the wireless protocol 38 to communicate with the primary device can include WiFi, GSM, LTE, or any other protocol that can transmit data across larger distances, or over a global wireless network 47, such as the Internet. The remote device 32 can be, for example, a hand-held computer, a smart phone, a tablet computing device, a personal digital assistant device, or the like.

In an embodiment where the smart monitoring system 20 can be utilized for fleet management, the central control modules 22 of the one or more power equipment machines 10 can broadcast status information (including inner-active information 21). In some examples, the broadcasting can take place periodically. In other examples, the broadcasting of the information 21 can occur when the remote device 32 is within a certain predefined range of the power equipment machine 10. For example, the status information 21 can include a fleet management property that comprises one or more of hours run, operator code, sensor status, temperature, voltage, oil pressure, location data, and the like for any machine 10 in the fleet or the whole fleet. The remote device 32 can receive the status information 21 and engage in one or more fleet management tasks. For example, the remote device 32 can track the power equipment machine (e.g., based on GPS tracking and/or location data), profile the proximity and path loss of the fleet, time stamp the status information, transmit maintenance schedules for the power equipment machines 10, and distribute information related to fleet activities. The remote device 32 can also communicate the status information and any other information to the primary device 50. The primary device 50 can use the status information and any other information to increase fleet productivity, reduce labor cost, increase efficiency, reduce operating expenses, control unauthorized use of the power equipment machines 10, track used power equipment machines 10, provide early alerts for maintenance schedules, reduce or eliminate paper work, provide pass codes and privileges to operators, create logs related to the status information, and determine power equipment machines 10 and/or operators prone to accidents. The primary device 50 can send information to the remote device 32 based on its use of the status information and the any other information.

Figure 3:
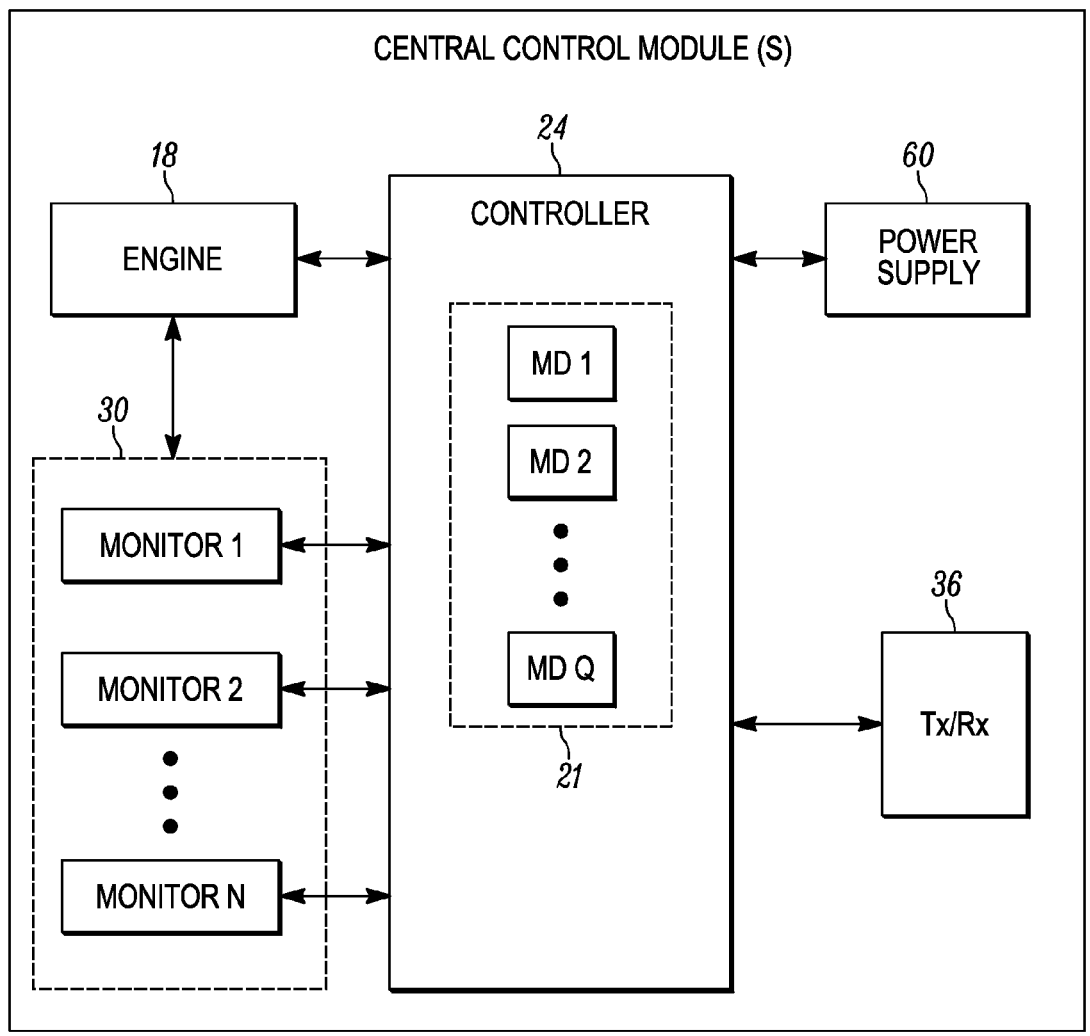
FIG. 3 is a central control module that can be utilized by power equipment, such as a lawn tractor, within a smart monitoring system in accordance with one embodiment of the present disclosure.

Referring now to FIG. 3, illustrated is an example of a central control module (or slave (S)) 22. The central control module 22 can be associated with an engine 18 of a power equipment machine. The central control module 22 can include a controller 24 (e.g., a microcontroller that can include an application specific integrated circuit (ASIC) or a processor and a non-transitory memory). The controller 24 can be powered by a power supply 60 associated with the power equipment machine. In some examples, the controller 24 can be coupled to the engine 18 to control the operation of the engine and/or to record the hours that the engine has run.

The central control module 22 can include a plurality of monitors (e.g., monitor 1-monitor N) 30. For example, the plurality of monitors can include a plurality of sensors each configured to record data related to a parameter of operation of the power equipment machine. For example, the plurality of monitors 30 can include, but are not limited to, an hours running monitor, an operator code monitor, a temperature sensor, a voltage sensor, a pressure sensor, a status monitor, and the like. The plurality of monitors 30 can transmit their associated recording data to the controller 24 and the non-transitory memory of the controller can store the recording data as inner-active data 21 (e.g., MD 1-MD Q). For example, the processor of the controller 24 can execute instructions stored in the non-transitory memory of the controller to cause the sensors to record and/or transmit their associated data to the controller.

The controller 24 can send the inter-active data 21 to the transceiver (Tx/Rx) 36 for transmission. In some examples, the transceiver 36 can broadcast the inner-active information 21 periodically. In other examples, the transceiver 36 can broadcast the inner-active information 21 upon receiving a signal from the remote device. The transceiver 36 can broadcast different inner-active information 21 at different times. For example, at the beginning of a shift or after a break, the transceiver 36 can broadcast operator identification information. During the shift, the transceiver 36 can broadcast other status information related to the operations of the power equipment machine.

Referring now to FIG. 4, illustrated is a remote control module (or master (M)) 49 of a remote device 32. The remote control module 49 can be a master to the slave central control module 22 of the power equipment devices. In other words, the remote control module 49 can control the central control modules of the power equipment devices 10. For example, the remote control module 49 can send a signal to the central control module 22 telling the central control module to send inner-active data 21. The central control module 22 must send the inner-active data 21 upon receiving the request.

The remote control module 49 can include a transceiver (Tx/Rx) that can communicate according to multiple wireless communication protocols (e.g., protocol 1-protocol N). Accordingly, the remote control module 49 can communicate with the central control module 22 according to one protocol (e.g., Bluetooth low energy for transmission over short distances) and with the primary device 50 according to another wireless communication protocol (e.g., to transmit a text alert, a short message service (SMS) alert, a voice alert, or the like, over long distances). The remote control module 49 can also include a user interface 35 and a display 34. The user interface 35 can include a keyboard (or virtual keyboard) or other input device that allows a user to enter information. The display 34 can include a mechanism to visually or audibly render information.

The remote control module 49 can also include a controller 33. The controller 33 can include a non-transitory computer readable storage medium storing machine executable instructions; and a processor to access the non-transitory computer readable storage medium and execute the machine executable instructions. For example, the non-transitory memory can store the inner-active information 21 received from the central control module 22. Upon execution of the machine-executable instructions, the controller (or control module) can determine status information for one or more power equipment machines based on the stored inner-active information 21 (e.g., from one power equipment machine or multiple power equipment machines). For example, the status information 21 can include a number of hours the engine associated with the power equipment machine 10 has run, an operator code related to the power equipment machine, a status of a sensor associated with the power equipment machine, a voltage associated with the engine of the power equipment machine, an oil pressure associated with the power equipment machine, and the like.

Upon determining the status information, the controller 33 can render a visualization based on the status information for display on the display 34. For example, the visualization can include location information, proximity information, a time stamp, maintenance information, and/or information about the status of the device related to statuses of a plurality of similar devices in a fleet of devices. The controller can also create one or more logs 37 of the status information. As illustrated, the logs 37 can include log 1-log M. The logs can correspond to different machines, different monitored properties and/or fleet management properties within the status information, information received from the primary device, etc.

In some examples, the controller 33 can include a global location unit (GLU) 39. The GLU 39 can determine location information that indicates the global location of the power equipment machine, movements of the power equipment machine, and/or dwell time at a location of the power equipment machine. The GLU 39 can determine the location information by determining a strength of a signal transmitted from the power equipment machine. In some examples, the GLU 39 can determine the location based on a received signal strength indicator (RSSI). For example, the remote control module (M) 39 can be embodied on a smart phone device with a built-in global positioning system (GPS) unit that can determine the location information (e.g., proximity of the power equipment device to the smart phone device) based on the RSSI. For example, the proximity can be accurate within about 300 meters.

In some instances, the operator of the power equipment machine can also have a smart phone device with a GPS unit, which can work with the GPS unit on the smart phone device with the remote control module to make the location information more accurate. For example, the proximity can be accurate to 150 meters. The GLU 39 can provide a cost advantage compared to systems requiring GPS devices to be installed on every control unit 22. Moreover, in yet another example embodiment, a single GLU 39 can operate to provide status information 21 relating to one or multiple machines 10 that are located within wireless range as described above.

The controller 33 can group the global location data with the status information and log and/or display the location with the status information. In other examples, the controller 33 can include a time stamp unit (or clock) that can add a time to the status information and log and/or display the time stamp with the status information. In still other examples, the controller 33 can include a messaging unit (MU) 41 to transmit messages related to the status information 21 and the location for each of the plurality of power equipment machines 10 to a primary device 50 at a remote location.

Figure 5:
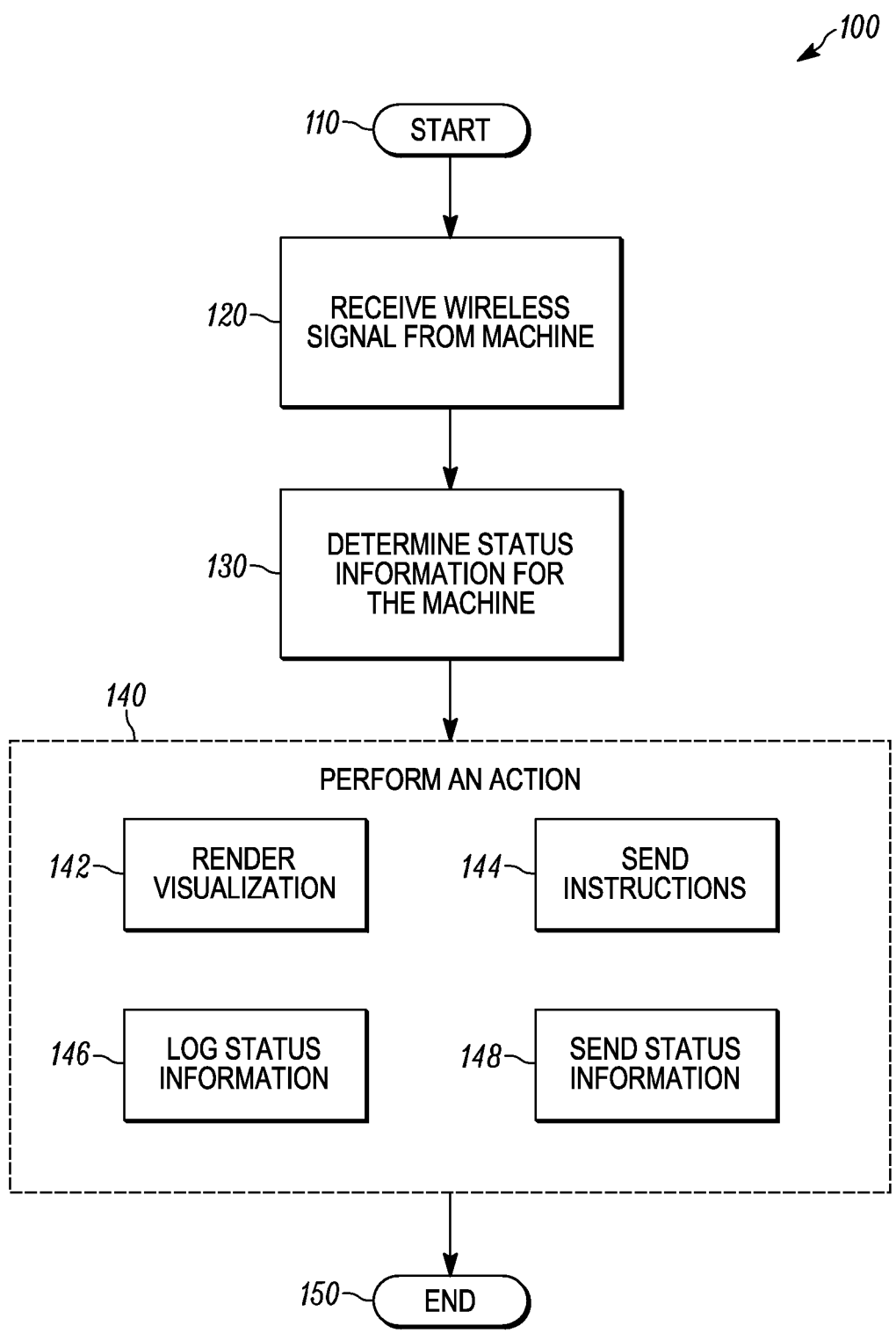
FIG. 5 is a method of operation of the smart monitoring system in accordance with one example embodiment of the present disclosure.

Turning now to FIG. 5, illustrated is a method of operation 100 of the smart monitoring system in accordance with one example embodiment of the present disclosure. For example, the method 100 can be executed by a system comprising a non-transitory memory and a processor. The method can start at 110. At 120, a wireless signal can be received (e.g., by remote device 32) from a machine (e.g., power equipment machine 10). For example, the wireless signal can be transmitted according to a Bluetooth low energy protocol or another type of protocol that facilitates transmission of information across a short distance. At 130, the status information for the machine can be determined (e.g., by remote device 32). At 140, an action can be performed on the machine based on the status information. For example, the action can include rendering a visualization of the status information at 142. In another example, at 144, the action can include sending instructions to the machine (e.g., the machine is a slave to the remote device, so the machine will execute the instructions). In yet another example, the status information can be logged 146. In still another example, at 148, the status information can be sent to another device (e.g., primary device 50). The communication with the primary device can use a different wireless protocol than the communication with the machine. The communication can include an wireless alert of a location of the machine, an alert of the status of the machine, an alert of tracking information for the machine 10, an alert of an operator of the machine, an alert of a status of a sensor related to the machine, an alert of maintenance due for the machine, an alert of an accident related to the machine, a log of status information for the machine, or the like. The method ends at 150.

Figure 6:
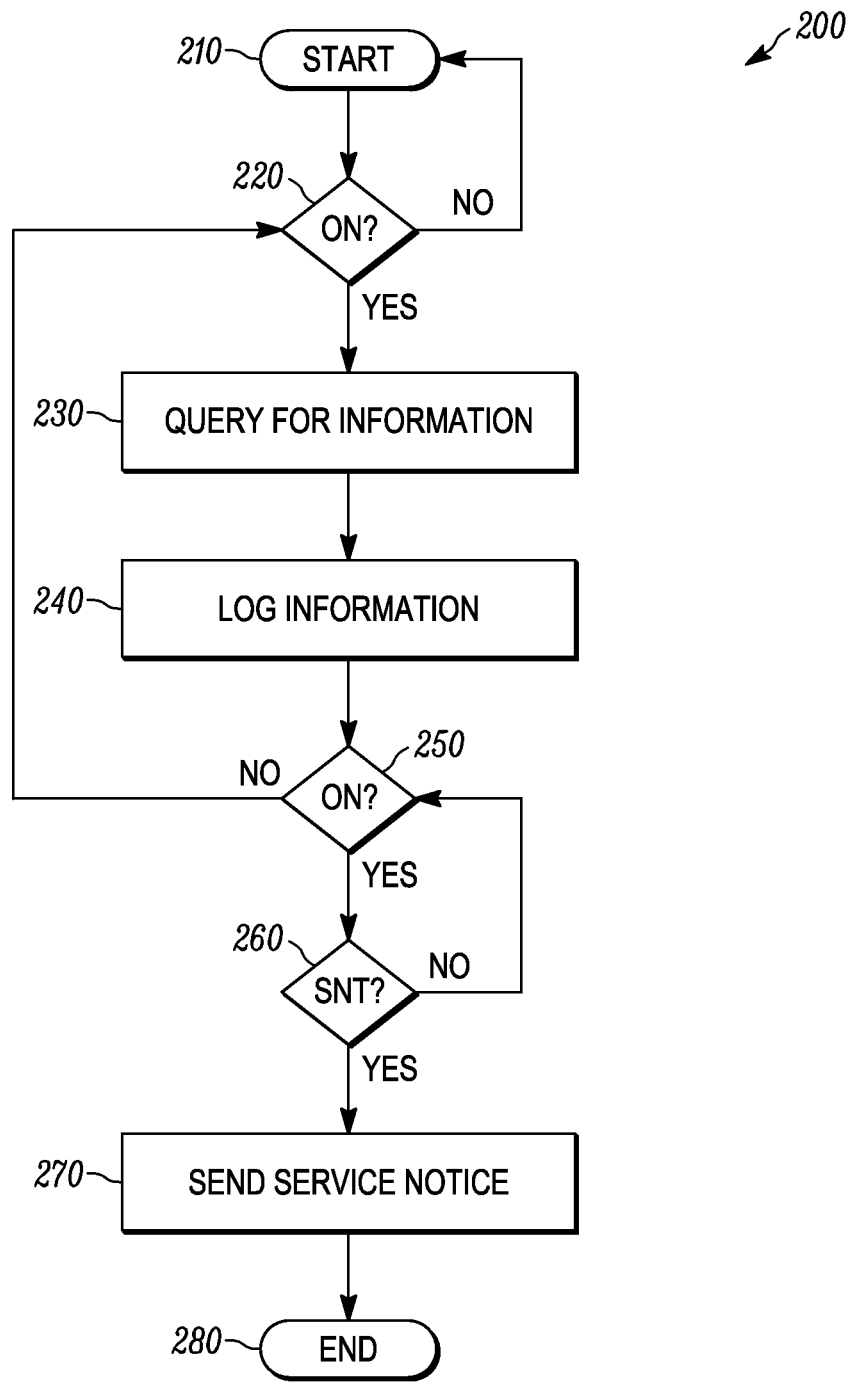
FIG. 6 is a method of operation of the smart monitoring system in accordance with one example embodiment of the present disclosure.

Illustrated in FIG. 6 is a method 200 of operating a smart monitoring system 20 in accordance with one example embodiment of the present disclosure. At 210, the method 200 is enabled by components of the smart monitoring system 20, residing on a particular piece of power equipment 10. For example, one component can include a monitor that tracks the total time duration of the engine 18 operation. In another example embodiment, the method 200 is also enabled by the entering or scanning of the serial number associated with the power equipment 10.

At 220, the method 300 determines through the use of the central control module 22 whether or not the engine 18 is operating. If the determination 220 is an affirmative, the method proceeds to step 230. If the determination 220 is negative, the method returns to the start at 210. At 230, the method 200 initiates a query for information. For example, the method 200 can trigger the hour meter and a log (database or memory within the central control unit or the remote control unit) that accumulates a running total of hours the engine 18 is operating. The method 200 can similarly trigger other sensors within the central control unit 22 to record inner-active information. At 240, the information recorded by the sensor that is triggered can be logged. The current log accumulation is incremented by a prescribed unit of time, causing the log's running time total to increase to the same value as hours of operation of the engine 18.

In one example embodiment, the hour meter is located within the central control unit 22 and compiled by a processor or application specific analog circuit (ASIC), or a combination of both within the control unit and are coupled to a printed circuit board (PCB). The processor includes non-transitory computer readable medium storing machine executable instructions. The processor further comprises an input interface configured to receive and transmit hour meter data, such as real-time, accumulated time, and operation (on/off) status.

The method 200 continues to a determination at 250, confirming that the power equipment engine 18 is still operating. If the answer to the determination 250 is a negative, it passes back to determination step 220. If the answer to determination step 250 is an affirmative, the process passes to step 260. The method 200 at step 260 performs a determination in whether or not the time value of the log equals a prescribed service time. If the determination at 260 is negative, the process proceeds to step 250. If the determination at 260 is an affirmative, it proceeds to step 270. At 270, the method 200 transmits inner-active information 21 to the remote device 32.

In one example embodiment, the inner-active information 21 includes, but is not limited to, hours of engine operation, oil pressure, fuel level, engine temperature, tractor location (via GPS), tractor's movements and/or dwell time at a location, mechanical wear, service reminders, operation trouble shooting guidance, link to service or part suppliers, signature identification unique to each tractor, remote operation/control, remote status check (ON or OFF), time stamping, remote start-up, remote brake, and remote power-take-off (PTO) enablement and disablement. In an alternative example embodiment, the inner-active information 21 is transmitted to the remote device 32 without step 260, but instead the inner-active information is sent when solicited by the remote device 32. The remote device 32 can transmit the inner-active information 21 (or processed information based on the inner-active information) to the primary device 50.

The method can proceed to step 270 when it is determined that it is service notification time. At 270, the service information can be sent from the database of the primary device 50 to the remote device 32. In one example embodiment, the service information includes 21, but is not limited to, need for: an oil change; air filter change; mower blade sharpening; deck leveling; and replacement of battery; and/or total hours run; video or written instructions on how to perform maintenance on the power equipment 10; location of service centers for the power equipment; and purchasing of parts for the power equipment. Such service information can be solicited by the operator of the remote device, however, the service information is accurately provided to the operator based on the inner-active information of the hour meter (hours of operation) provided by the central control module 22 to the remote device 32, to the primary device 50, and back to the remote device.

Figure 7:
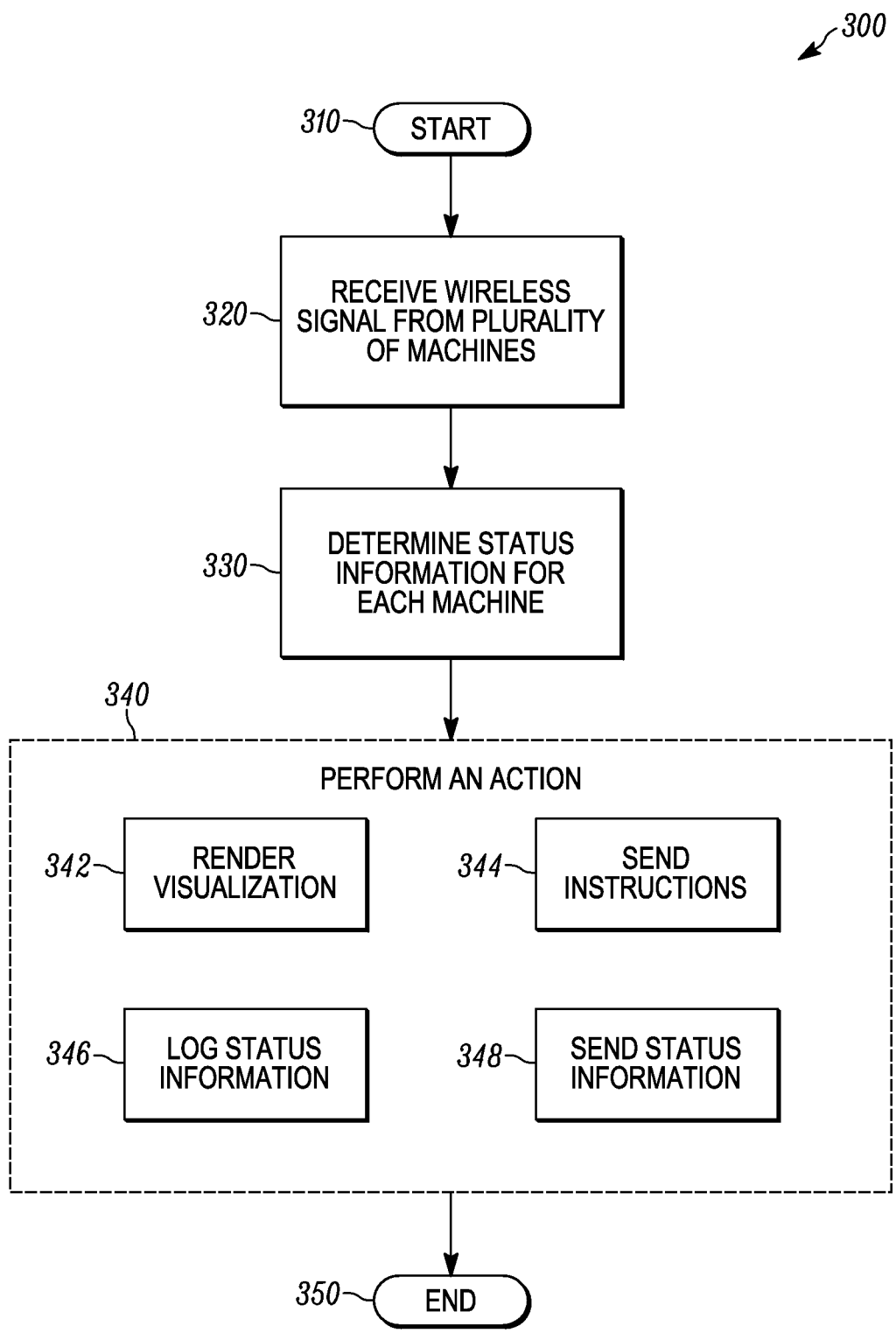
FIG. 7 is a method of operation of the smart monitoring system in accordance with one example embodiment of the present disclosure.

Turning now to FIG. 7, illustrated is a method of operation 300 of the smart monitoring system in accordance with one example embodiment of the present disclosure. For example, the method 300 can be executed by a system comprising a non-transitory memory and a processor. The method can start at 310. At 320, a plurality of wireless signals can be received (e.g., by remote device 32) from a plurality of machines (e.g., power equipment machines 10). For example, the wireless signals can be transmitted according to a Bluetooth low energy protocol or another type of protocol that facilitates transmission of information across a short distance. At 330, the status information for the plurality of machines can be determined (e.g., by remote device 32). At 340, an action can be performed on the plurality of machines based on the respective status information. For example, the action can include rendering a visualization of the status information at 342. In another example, at 344, the action can include sending instructions to the plurality of machines (e.g., the machines are slaves to the remote device 32, so the machines will execute the instructions). In yet another example, the status information can be logged 346. In still another example, the status information can be sent to another device (e.g., primary device 50). The communication with the primary device 50 can use a different wireless protocol than the communication with the machines. The wireless communication can include an alert of a location of the plurality of machines, an alert of the status of the plurality of machine (or one machine that is different from the rest), an alert of tracking information for the plurality of machines (or a single machine that is incorrectly tracked), an alert of an operators of the plurality of machines (or a single operator who is out of place), an alert of a status 348 of a sensor related to one or more of the plurality of machines, an alert of maintenance due for one or more of the plurality of machines, an alert of an accident related to one or more of the plurality of machines, a log of status information for the plurality of machines, or the like. The method ends at 350.

Referring now to FIGS. 8-32, illustrated are examples of graphical user interfaces that can be displayed on the remote device 32. User inputs in response to the displays on the graphical user interface can be used to create various fleet management tasks for the respective machines to execute as slaves to the remote device 32.

FIG. 8 is a graphical user interface of the smart monitoring system 20 as shown on a remote device 32 in accordance with one example embodiment of the present disclosure. The graphical interface of FIG. 8 prompts the owner or operator, allowing the keying in of the serial number assigned to the power equipment 10.

FIG. 9 is a graphical user interface of the smart monitoring system 20 as shown on a remote device 32 in accordance with one example embodiment of the present disclosure. The graphical interface of FIG. 9 illustrates a keyboard for entering a serial number assigned to the power equipment 10, inquiries relating to the power equipment, that include but are not limited to, hours of operation not accounted for, model number, ownership information, and the like.

FIG. 10 is a graphical user interface of the smart monitoring system 20 as shown on a remote device 32 in accordance with one example embodiment of the present disclosure. The graphical interface of FIG. 10 illustrates an interface with the operator of the power equipment.

Figure 11:
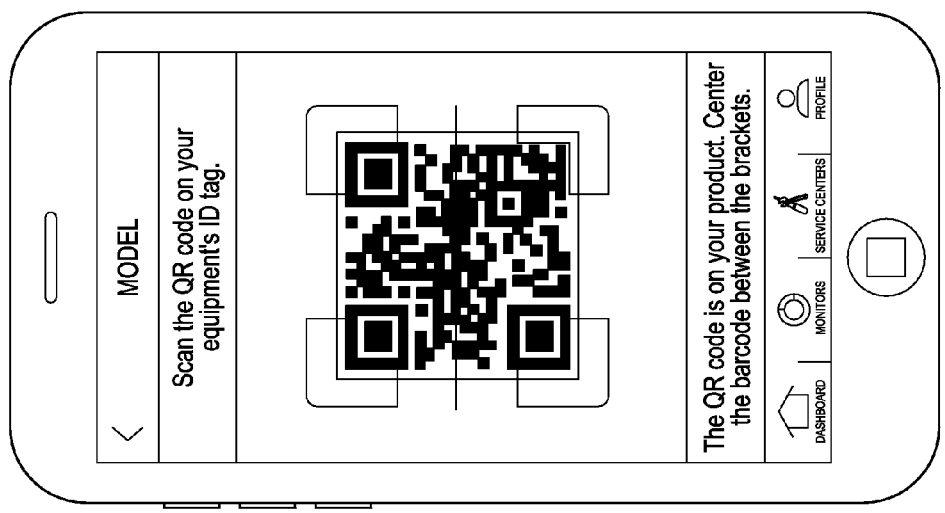
FIG. 11 is a graphical user interface of the smart monitoring system as shown on a remote device in accordance with one example embodiment of the present disclosure.

FIG. 11 is a graphical user interface of the smart monitoring system 20 as shown on a remote device 32 in accordance with one example embodiment of the present disclosure. The graphical interface of FIG. 11 illustrates a QR or internal barcode scanner that identifies signature information such as a serial number associated with the power equipment 10.

Figure 12:
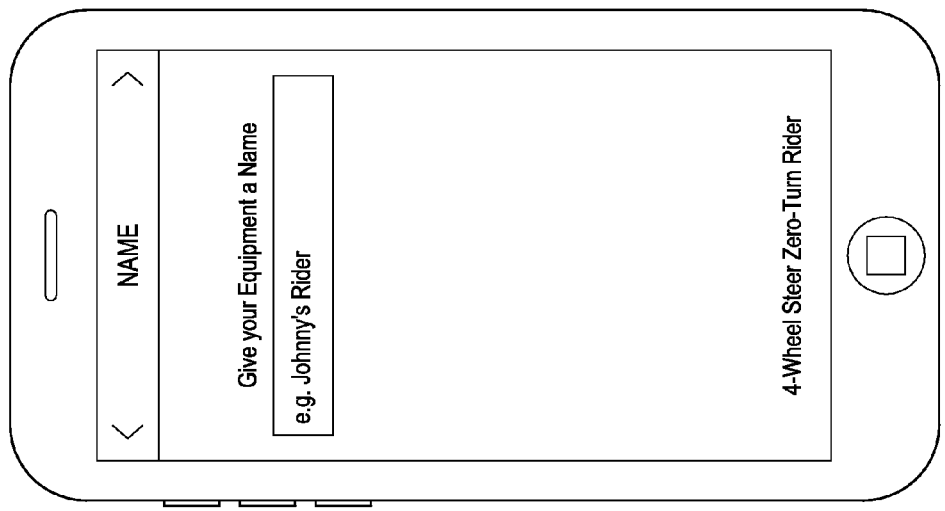
FIG. 12 is a graphical user interface of the smart monitoring system as shown on a remote device in accordance with one example embodiment of the present disclosure.

FIG. 12 is a graphical user interface of the smart monitoring system 20 as shown on a remote device 32 in accordance with one example embodiment of the present disclosure. The graphical interface of FIG. 12 illustrates an interface that allows the operator to select a personal name for his account associated with the associated power equipment 10.

Figures 13, 14:
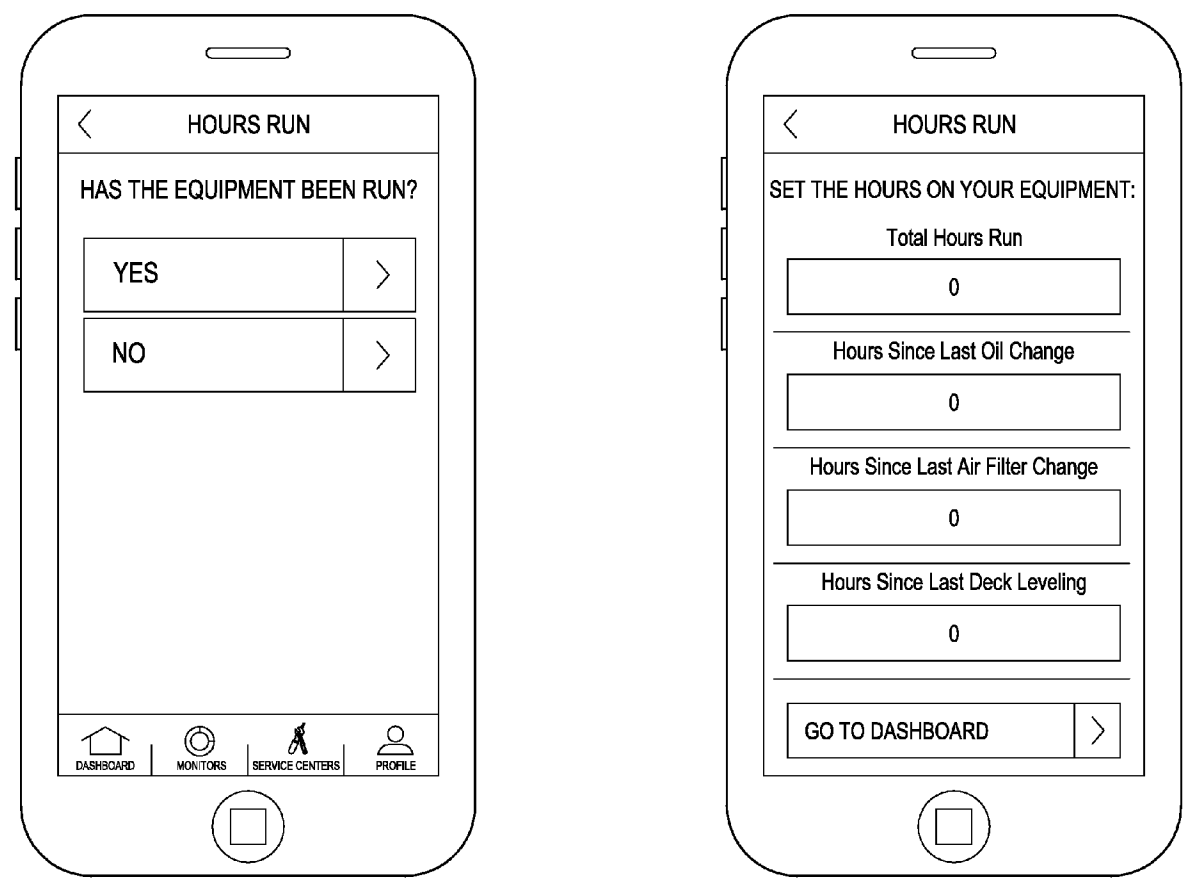

FIGS. 13 and 14 are graphical user interfaces of the smart monitoring system 20 as shown on a remote device 32 in accordance with one example embodiment of the present disclosure. The graphical interfaces of FIGS. 13 and 14 illustrate values that can be input and added to the service information, such as total hours run, hours since last oil change, hours since last air filter change, and hours since last deck leveling.

Figure 16:
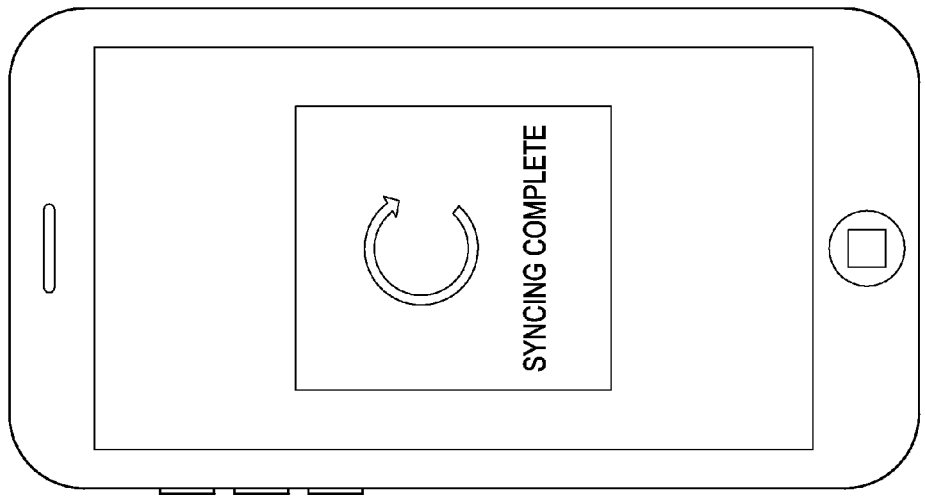
FIG. 16 is a graphical user interface of the smart monitoring system as shown on a remote device in accordance with one example embodiment of the present disclosure.
Figure 15:
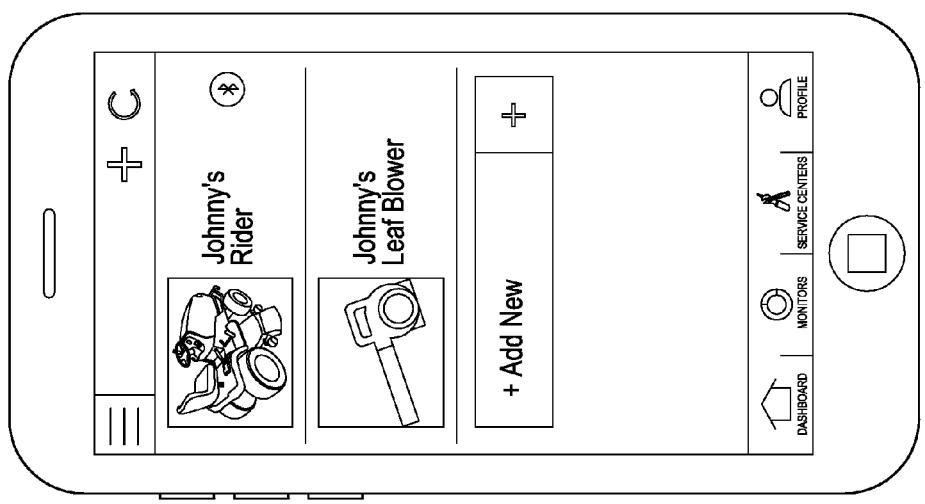
FIG. 15 is a graphical user interface of the smart monitoring system as shown on a remote device in accordance with one example embodiment of the present disclosure.

FIGS. 15 and 16 are graphical user interfaces of the smart monitoring system 20 as shown on a remote device 32 in accordance with one example embodiment of the present disclosure. The graphical interfaces of FIGS. 15 and 16 illustrate the operator's ability to add additional power equipment to the software internal to the remote device 32, and the ability to synchronize any new data from FIGS. 8-14 with existing inner-active data 21 within the central control module 22.

Figures 17, 18:
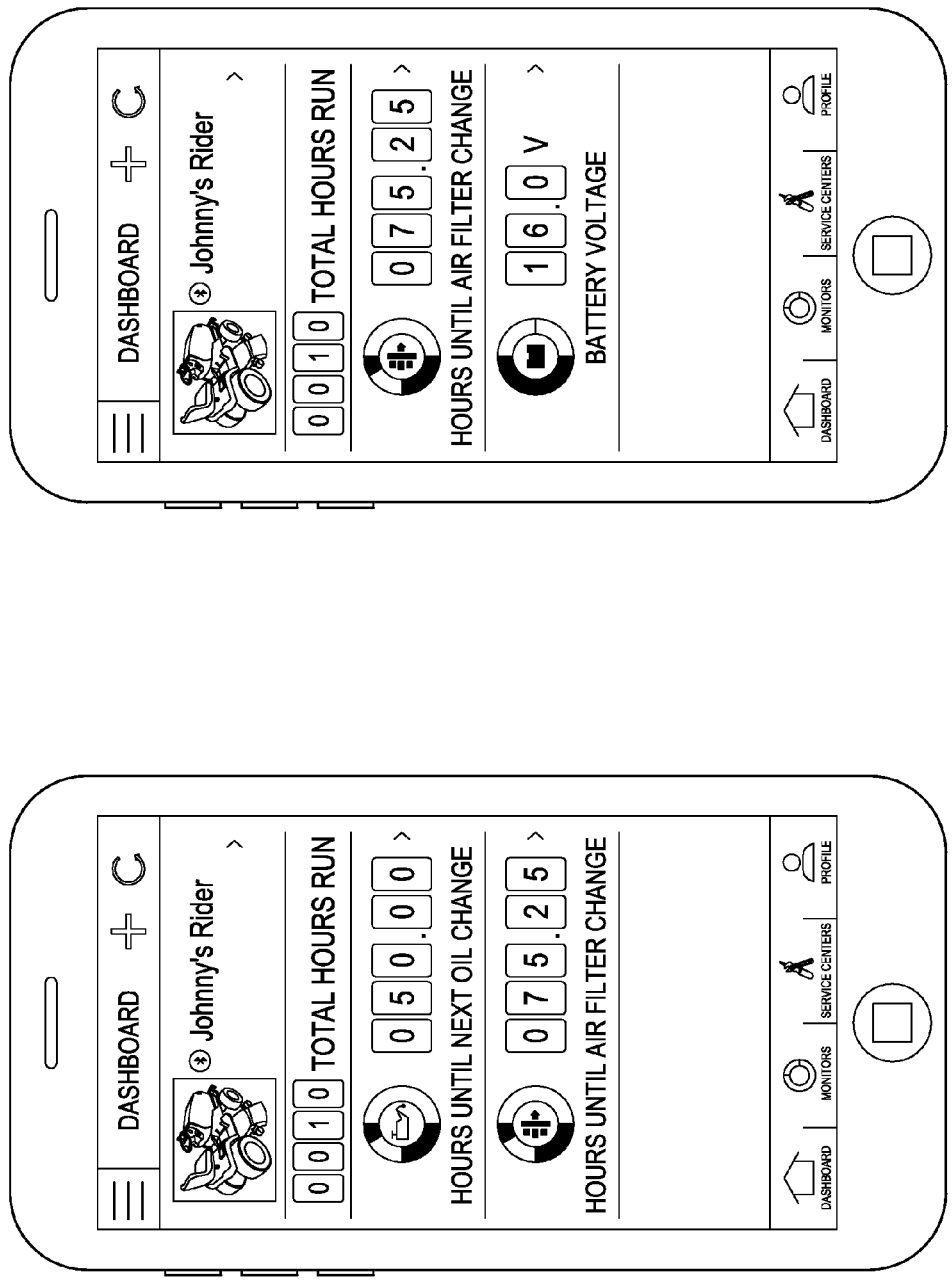
FIG. 17 is a graphical user interface of the smart monitoring system as shown on a remote device in accordance with one example embodiment of the present disclosure.
FIG. 18 is a graphical user interface of the smart monitoring system as shown on a remote device in accordance with one example embodiment of the present disclosure.

FIGS. 17 and 18 are graphical user interfaces of the smart monitoring system 20 as shown on a remote device 32 in accordance with one example embodiment of the present disclosure. The graphical interfaces of FIGS. 17 and 18 illustrate the inner-active information 21, namely the hours the power equipment 10 has operated in hours, and service information, including hours until next oil change, hours until next air filter change, and battery voltage.

FIG. 19 is a graphical user interface of the smart monitoring system 20 as shown on a remote device 32 in accordance with one example embodiment of the present disclosure. The graphical interface of FIG. 19 illustrates service information capable of being downloaded to the remote device 32 from the primary device 50.

Figure 20:
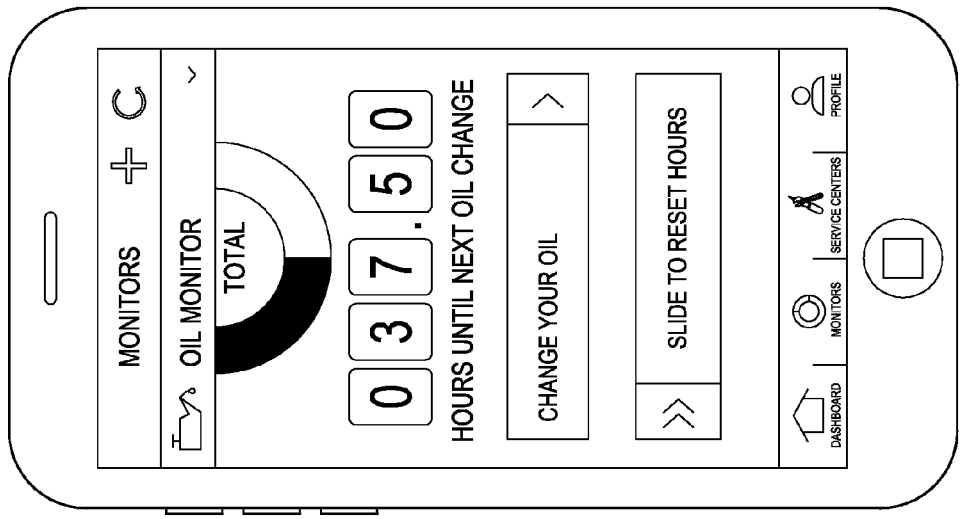
FIG. 20 is a graphical user interface of the smart monitoring system as shown on a remote device in accordance with one example embodiment of the present disclosure.
Figure 21:
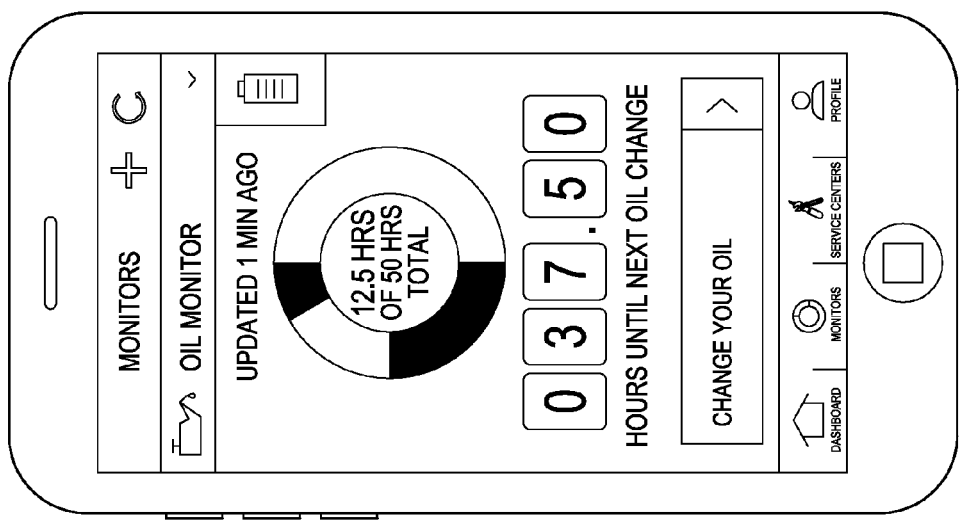
FIG. 21 is a graphical user interface of the smart monitoring system as shown on a remote device in accordance with one example embodiment of the present disclosure.

FIGS. 20 and 21 are graphical user interfaces of the smart monitoring system 20 as shown on a remote device 32 in accordance with one example embodiment of the present disclosure. The graphical interfaces of FIGS. 20 and 21 illustrate the inner-active information 21, namely the hours the power equipment 10 has operated in hours, and service information, which includes hours until next oil change.

Figures 22, 23:
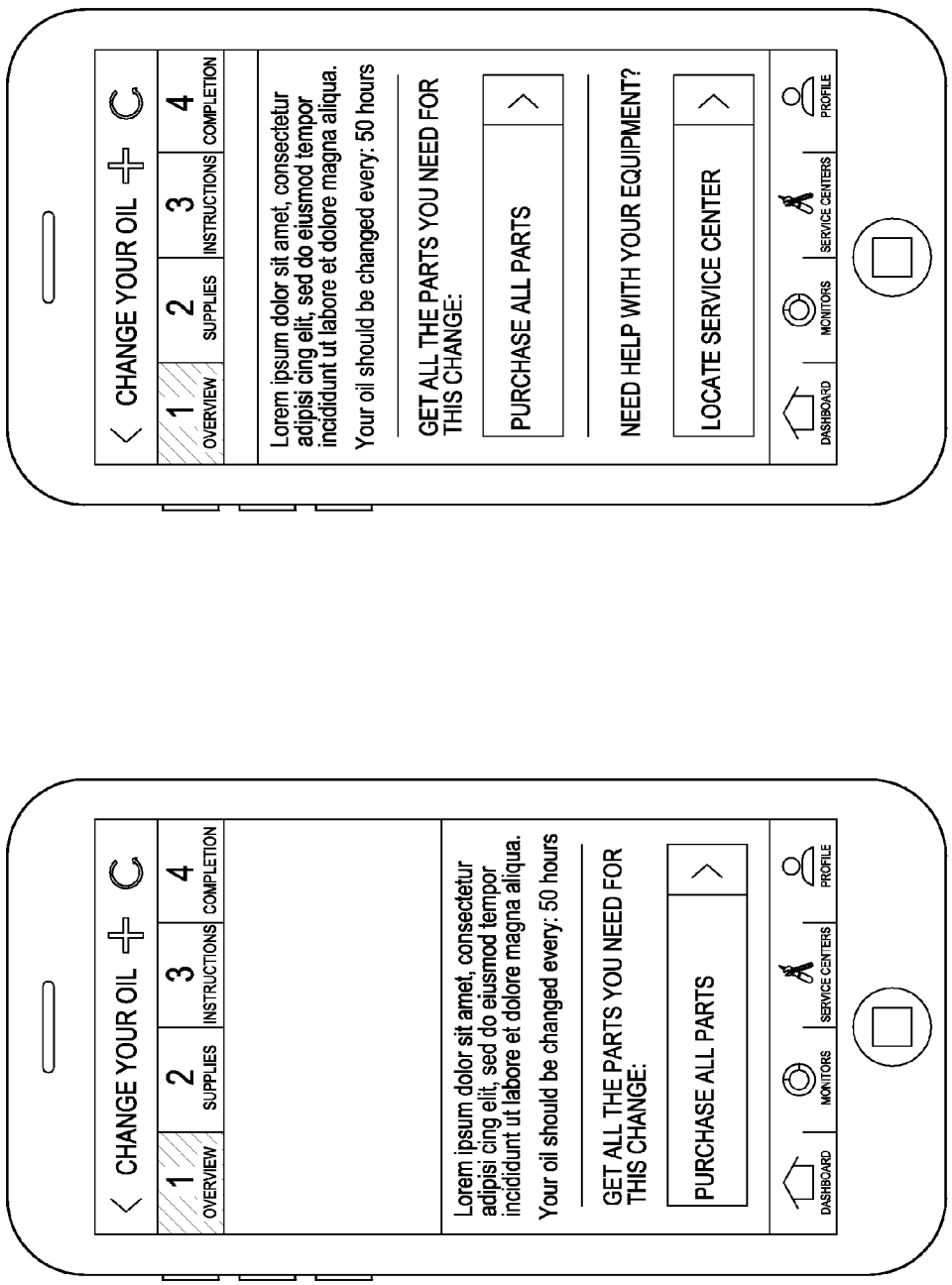
FIG. 22 is a graphical user interface of the smart monitoring system as shown on a remote device in accordance with one example embodiment of the present disclosure.
FIG. 23 is a graphical user interface of the smart monitoring system as shown on a remote device in accordance with one example embodiment of the present disclosure.

FIGS. 22 and 23 are graphical user interfaces of the smart monitoring system 20 as shown on a remote device 32 in accordance with one example embodiment of the present disclosure. The graphical interfaces of FIGS. 22 and 23 illustrate the service information, including how a particular maintenance job is performed, such as an oil change, supplies that are needed, where to locate a service center, and where to buy parts.

Figure 25:
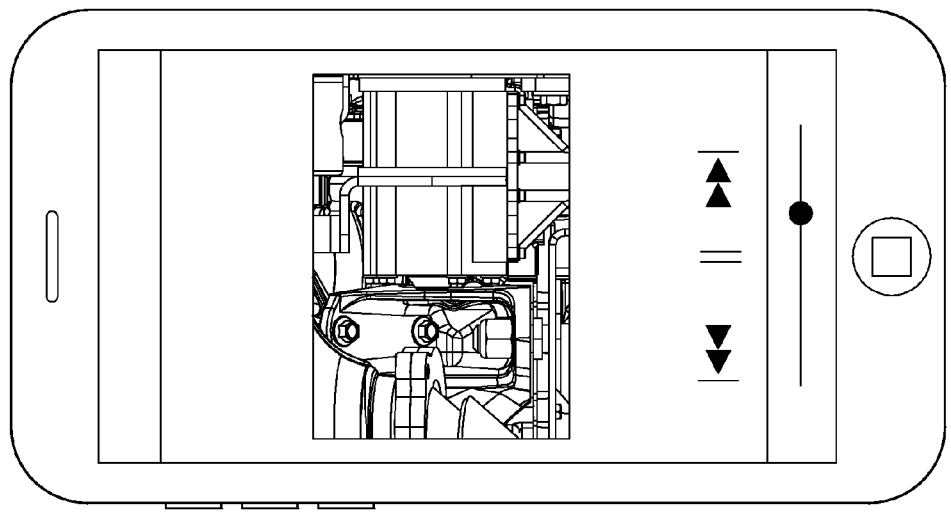
FIG. 25 is a graphical user interface of the smart monitoring system as shown on a remote device in accordance with one example embodiment of the present disclosure.
Figure 24:
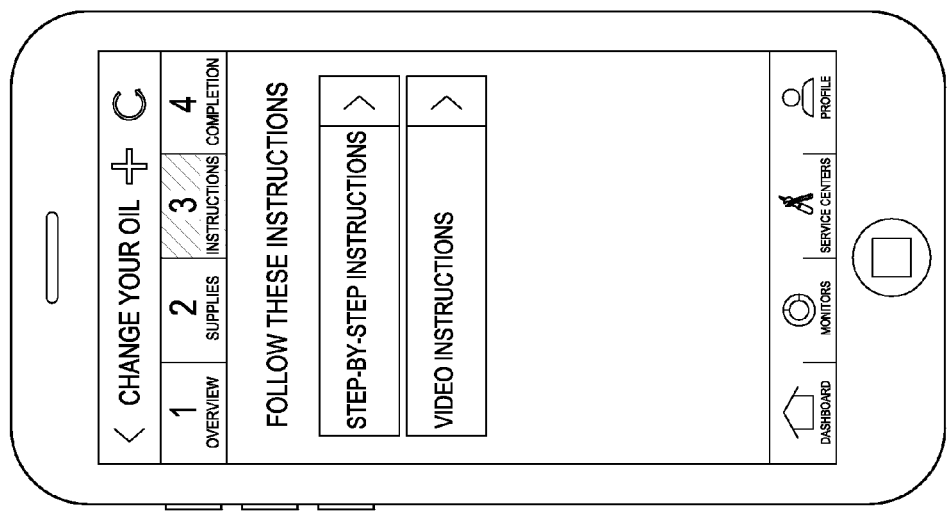
FIG. 24 is a graphical user interface of the smart monitoring system as shown on a remote device in accordance with one example embodiment of the present disclosure.

FIGS. 24 and 25 are graphical user interfaces of the smart monitoring system 20 as shown on a remote device 32 in accordance with one example embodiment of the present disclosure. The graphical interfaces of FIGS. 24 and 25 illustrate service information that includes a listing of parts needed for performing a maintenance operation and a description of the parts and how they are used.

Figures 26, 27:
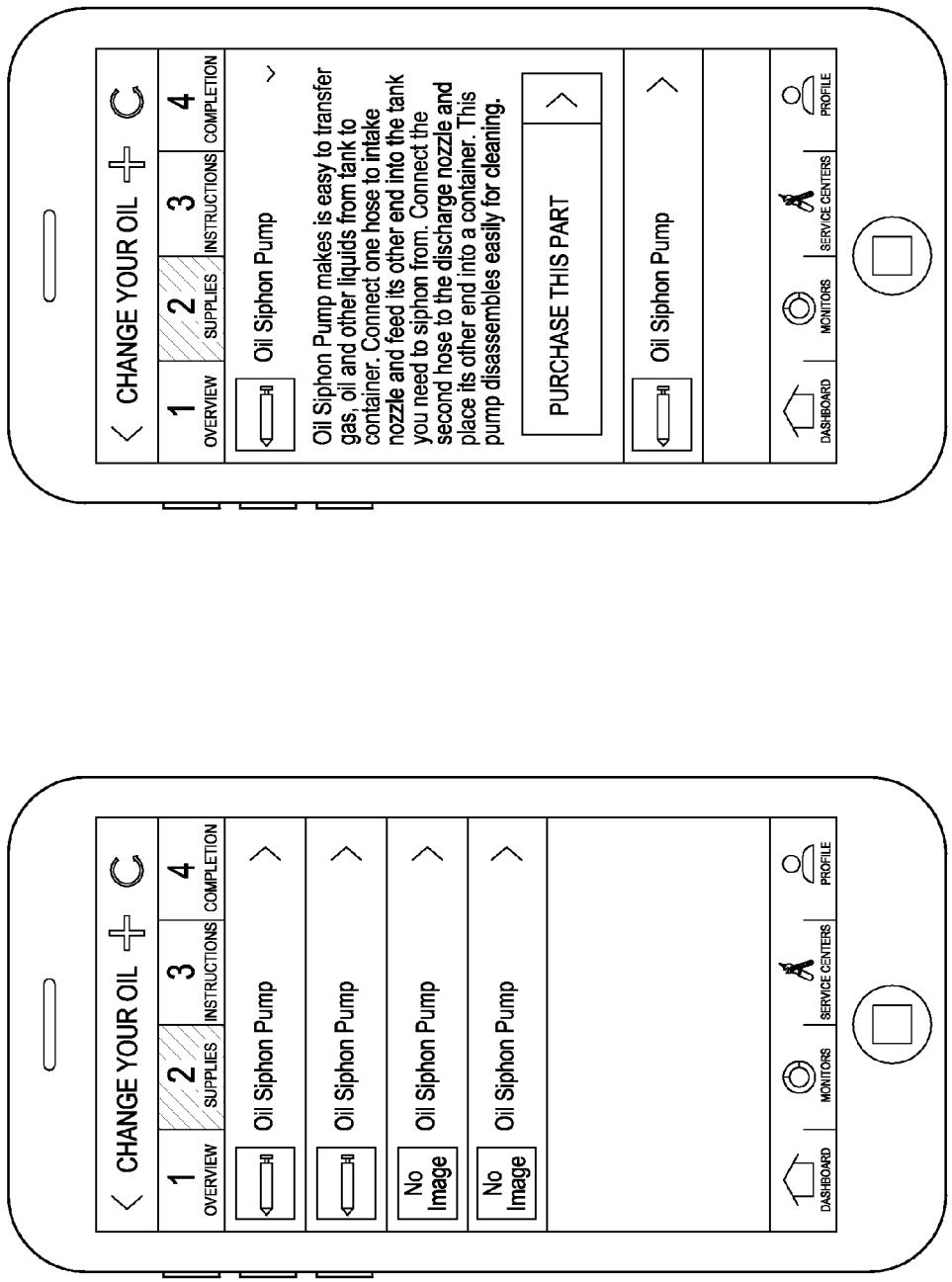
FIG. 26 is a graphical user interface of the smart monitoring system as shown on a remote device in accordance with one example embodiment of the present disclosure.
FIG. 27 is a graphical user interface of the smart monitoring system as shown on a remote device in accordance with one example embodiment of the present disclosure.

FIGS. 26 and 27 are graphical user interfaces of the smart monitoring system 20 as shown on a remote device 32 in accordance with one example embodiment of the present disclosure. The graphical interfaces of FIGS. 26 and 27 illustrate the service information including videos on how to perform an operation such as starting the power equipment or performing a maintenance task, like changing the oil on the power equipment 10.

Figure 28:
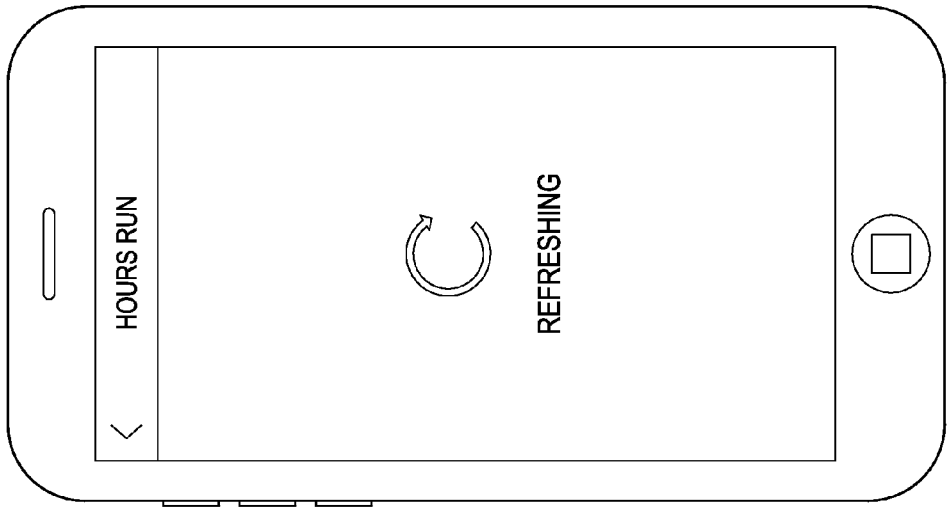
FIG. 28 is a graphical user interface of the smart monitoring system as shown on a remote device in accordance with one example embodiment of the present disclosure.
Figure 29:
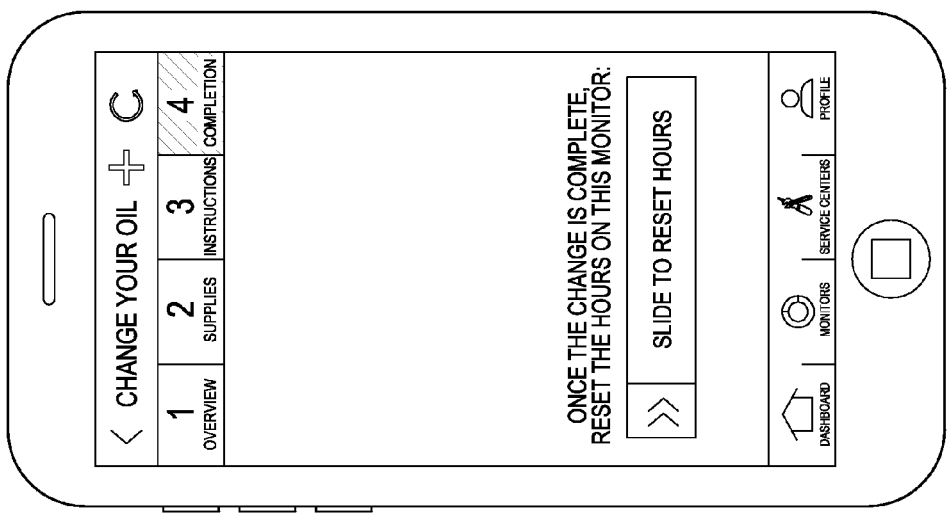
FIG. 29 is a graphical user interface of the smart monitoring system as shown on a remote device in accordance with one example embodiment of the present disclosure.

FIGS. 28 and 29 are graphical user interfaces of the smart monitoring system 20 as shown on a remote device 32 in accordance with one example embodiment of the present disclosure. The graphical interfaces of FIGS. 28 and 29 illustrate how to reset the time associated with service information that is compared with the logs 37. For example, an oil change is recommended for every 50 hours of use. Therefore, the prescribed value of an oil change is 50 hours. Once the inner-active information 21 is received to the remote device 32, the logs 37 accumulate the hours and compares it to the prescribed amount, in this case 50 hours. Once the log accumulates or is notified that 50 hours has been reached, inner-active information 21 can be send to the primary device 50, which will transmit a notice to the remote device that the oil needs to be changed. Once changed, the operator of the remote device can reset the log count to zero as illustrated in FIG. 28.

Figure 31:
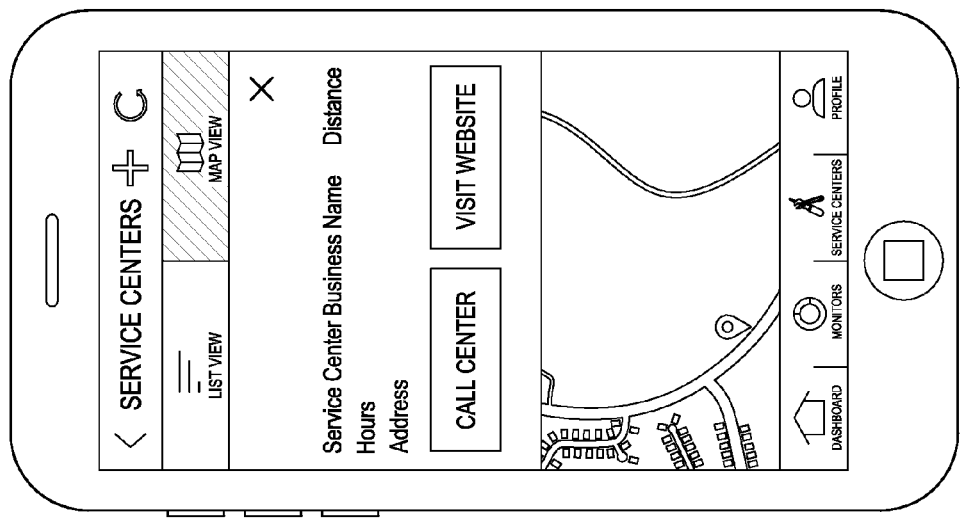
FIG. 31 is a graphical user interface of the smart monitoring system as shown on a remote device in accordance with one example embodiment of the present disclosure.
Figure 30:
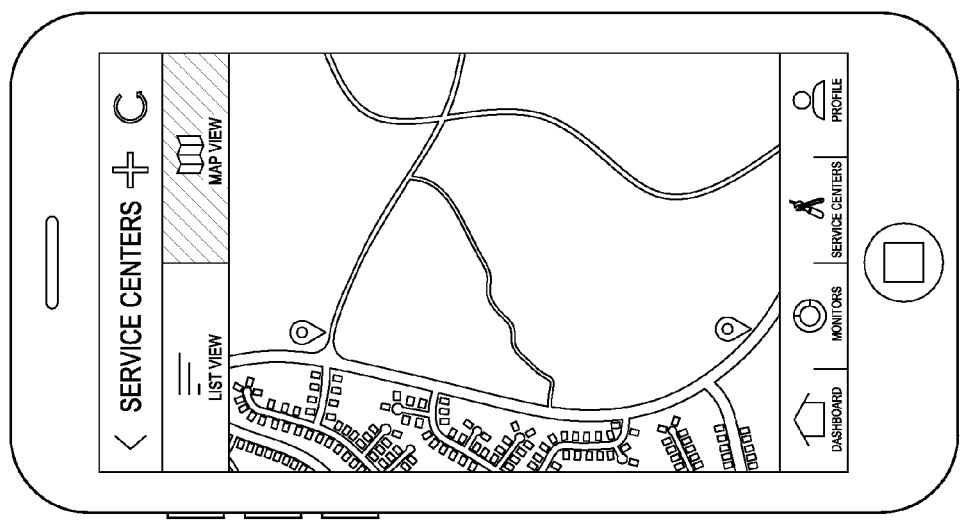
FIG. 30 is a graphical user interface of the smart monitoring system as shown on a remote device in accordance with one example embodiment of the present disclosure.

FIGS. 30 and 31 are graphical user interfaces of the smart monitoring system 20 as shown on a remote device 32 in accordance with one example embodiment of the present disclosure. The graphical interfaces of FIGS. 30 and 31 illustrate the service information, including directions, GPS location of the power equipment or service center, call center information, website location, and the like, all of which can be provided to the operator of the remote device 32.

Figure 32:
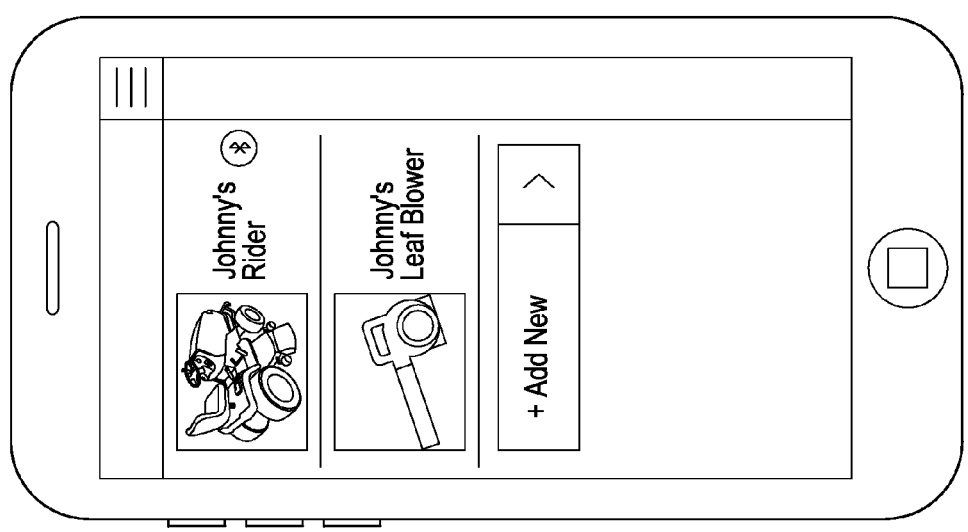
FIG. 32 is a graphical user interface of the smart monitoring system as shown on a remote device in accordance with one example embodiment of the present disclosure.

FIG. 32 is a graphical user interface of the smart monitoring system 20 as shown on a remote device 32 in accordance with one example embodiment of the present disclosure. The graphical interface of FIG. 32 illustrates the various pieces of power equipment 10 interfacing with the remote device 32.

As used herein, terms of orientation and/or direction such as upward, downward, forward, rearward, upper, lower, inward, outward, inwardly, outwardly, horizontal, horizontally, vertical, vertically, distal, proximal, axially, radially, etc., are provided for convenience purposes and relate generally to the orientation shown in the Figures and/or discussed in the Detailed Description. Such orientation/direction terms are not intended to limit the scope of the present disclosure, this application and the invention or inventions described therein, or the claims appended hereto.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A system comprising:
a fleet comprising a plurality of power-equipment-machines lawn mowers, each of the plurality of lawn mowers comprising a central control module, each central control module comprising:
a plurality of monitors, each configured to record data related to a parameter of operation of the lawn mower, wherein the recorded data comprises at least one of information related to hours of engine operation, oil pressure, fuel level engine temperature, location, movement and/or dwell time at a location, mechanical wear, unique signature identification, and time stamping;
a controller comprising a processor and a non-transitory computer readable medium to control operation of the plurality of monitor's and store the recorded data as inner-active data; and
a single short range transceiver to broadcast the inner-active data periodically and receive additional data according to a short-range wireless protocol; and
a handheld primary device to communicate with the central control modules of the plurality of lawn mowers, comprising:
a first transceiver to receive a plurality of signals broadcast according to the short-range wireless protocol from the plurality of lawn mowers, wherein each of the plurality of signals comprise the inner-active data for a respective lawn mower;
a central control module to determine status information for the plurality of lawn mowers based on the respective inner-active data;
a display module to render a visualization comprising a maintenance schedule for the fleet based on the status information for the plurality of lawn mowers; and
a second transceiver to transmit at least one of the inner-active data and the status information to a remote device according to a long-range wireless protocol, wherein the remote device sends information related to the maintenance schedule to the handheld device.

2. The system of claim 1, wherein the short-range wireless protocol comprises a Bluetooth Low Energy protocol.

3. The system of claim 1, wherein the second transceiver of the handheld device receives a long-range signal from a remote device comprising a fleet management property based on the plurality of inner-active information for the plurality of lawn mowers.

4. The system of claim 1, wherein the long-range wireless protocol facilitates transmission of at least one of a text alert and a short message service (SMS) message.

5. The system of claim 1, wherein the rendered visualization comprises at least one of location information, proximity information, a time stamp, and information about the status of one lawn mower device related to statuses of the plurality of lawn mowers in a fleet of devices.

6. A method, comprising:
receiving, by a handheld primary device comprising a non-transitory memory and a processor, a plurality of wireless signals from a fleet comprising a plurality of lawn mowers, each short range wireless signal transmitted from a control module within one of the lawn mowers in according to a short range wireless protocol, wherein each short-range wireless signal comprises inner-active data collected in response to operation of the respective lawn mower;
transmitting, by the handheld primary device, the inner-active data corresponding to the plurality of lawn mowers to a computing device located at a remote location according to a long-range wireless protocol, wherein the computing device determines status information for at least one of the plurality of lawn mowers based on the respective inner-active data and an action to be performed by the at least one of the lawn mowers based on the status information; and
controlling, by the handheld device, at least one of the lawn mowers to perform the action according to another short range wireless signal.

7. The method of claim 6, wherein the controlling at least one of the plurality of lawn mowers to perform the action further comprises determining a location of the at least one of the plurality of lawn mowers.

8. The method of claim 7, wherein the long-range wireless protocol comprises at least one of a text protocol and a short message service (SMS) protocol.

9. The method of claim 6, wherein the controlling at least one of the plurality of lawn mowers to perform the action further comprises tracking a location of the lawn mower based on the corresponding status information.

10. The method of claim 6, wherein the controlling at least one of the plurality of lawn mowers to perform the action further comprises wirelessly alerting a user of the lawn mower of maintenance due for the lawn mower based on the corresponding status information.

11. The method of claim 6, wherein the controlling at least one of the plurality of lawn mowers to perform the action further comprises; logging a portion of the inner-active data for the lawn mower for a time period.

12. A handheld mobile device, comprising:
a non-transitory computer readable storage medium storing machine executable instructions; and
a processor to access the non-transitory computer readable storage medium and execute the machine executable instructions, the machine executable instructions comprising:
a short-range transceiver to receive a plurality of wireless signals according to a short-range wireless protocol from a plurality of central control modules, wherein each central control module is located within a respective lawn mower in a fleet and each of the plurality of wireless signals comprises inner-active data collected in response to operation of the respective lawn mower, wherein the inner-active data comprise a received signal strength indicator (RSSI);

a central control module to determine status information for a plurality of lawn mowers based on the respective inner-active data;

a global location unit to determine location data for each of the plurality of lawn mowers based on the respective RSSIs a received signal and associate the location data for each of the plurality of lawn mowers with the status information for each of the plurality of lawn mowers; and a long-range transceiver to transmit another wireless signal comprising messages related to the status information and the location for at least one of the plurality of lawn mowers to a device at a remote location according to a long-range wireless protocol.

13. The handheld mobile device of claim 12, wherein the central control module determines a maintenance schedule associated with the plurality of lawn mowers based on the status information for the plurality of lawn mowers.

14. The handheld mobile device of claim 12, wherein the central control module determines an operator associated with one lawn mower of the plurality of lawn mowers base on the status information from the plurality of lawn mowers.

* * * * *